United States Patent
Kitano

(10) Patent No.: US 12,465,312 B2
(45) Date of Patent: Nov. 11, 2025

(54) RADIOGRAPHY SYSTEM

(71) Applicant: FUJIFILM CORPORATION, Tokyo (JP)

(72) Inventor: Koichi Kitano, Tokyo (JP)

(73) Assignee: FUJIFILM CORPORATION, Tokyo (JP)

(\*) Notice: Subject to any disclaimer, the term of this patent is extended or adjusted under 35 U.S.C. 154(b) by 208 days.

(21) Appl. No.: 18/462,439

(22) Filed: Sep. 7, 2023

(65) Prior Publication Data

US 2024/0081765 A1 Mar. 14, 2024

(30) Foreign Application Priority Data

Sep. 13, 2022 (JP) ................................ 2022-145494

(51) Int. Cl.
*A61B 6/00* (2024.01)

(52) U.S. Cl.
CPC ............ *A61B 6/5211* (2013.01); *A61B 6/544* (2013.01); *A61B 6/547* (2013.01)

(58) Field of Classification Search
CPC . G06T 2207/10116; G06T 2207/30004; G06T 2207/20132; G06T 2207/20221; G06T 7/11; G06T 7/0012; G06T 11/00; A61B 6/4452; A61B 6/4464; A61B 6/5211; A61B 6/5241; A61B 6/54; A61B 6/544; A61B 6/547; A61B 6/588
See application file for complete search history.

(56) References Cited

U.S. PATENT DOCUMENTS

| | | | | |
|---|---|---|---|---|
| 10,631,813 | B1* | 4/2020 | Huang | .................. G06T 7/0012 |
| 2008/0152088 | A1* | 6/2008 | Wang | .................. H04N 5/2624 |
| | | | | 378/98.12 |
| 2010/0172472 | A1* | 7/2010 | Ermes | .................. A61B 6/5241 |
| | | | | 250/336.1 |
| 2013/0315372 | A1* | 11/2013 | Behiels | .................... A61B 6/06 |
| | | | | 378/62 |
| 2014/0093044 | A1* | 4/2014 | Behiels | ................ A61B 6/5241 |
| | | | | 378/62 |

(Continued)

FOREIGN PATENT DOCUMENTS

| | | |
|---|---|---|
| JP | 2021-137414 A | 9/2021 |
| JP | 2021-191389 A | 12/2021 |

*Primary Examiner* — David J Makiya
*Assistant Examiner* — Soorena Kefayati
(74) *Attorney, Agent, or Firm* — SOLARIS Intellectual Property Group, PLLC

(57) ABSTRACT

A radiography system includes a radiation generation device including a radiation source unit that emits radiation, a projector that projects an image in an emission direction of the radiation, and at least one processor. The processor acquires distance information indicating a distance from the radiation source unit to a projection surface on which the image is projected, acquires a subject image which is a radiation image captured in the past for a subject of the radiation image, derives, based on the distance information, a visualization range of the subject visualized in the radiation image, which is captured for the subject and is based on the radiation emitted from the radiation source unit, trims the subject image based on the visualization range, and causes the projector to project the trimmed subject image.

7 Claims, 8 Drawing Sheets

(56) References Cited

U.S. PATENT DOCUMENTS

| | | | |
|---|---|---|---|
| 2015/0003674 A1* | 1/2015 | Eun | A61B 6/08 |
| | | | 382/103 |
| 2015/0208989 A1* | 7/2015 | Rackow | A61B 6/488 |
| | | | 378/206 |
| 2016/0135767 A1* | 5/2016 | Kim | A61B 6/08 |
| | | | 378/62 |
| 2016/0287195 A1* | 10/2016 | Tagawa | A61B 6/4452 |
| 2016/0350925 A1* | 12/2016 | Moon | G06T 3/20 |
| 2016/0374639 A1* | 12/2016 | Becker | A61B 6/08 |
| | | | 378/95 |
| 2017/0209110 A1* | 7/2017 | Kiraly | A61B 6/44 |
| 2018/0008224 A1* | 1/2018 | Arima | G06T 11/60 |
| 2018/0271462 A1* | 9/2018 | Shirota | A61B 6/4021 |
| 2019/0029627 A1* | 1/2019 | Katsushima | H04N 23/90 |
| 2019/0159740 A1* | 5/2019 | Van Ammel | A61B 6/5241 |
| 2019/0231294 A1* | 8/2019 | Guntzer | A61B 6/584 |
| 2019/0246996 A1* | 8/2019 | Lai | A61B 6/4452 |
| 2019/0343479 A1* | 11/2019 | Sato | A61B 6/06 |
| 2020/0237332 A1* | 7/2020 | Wang | A61B 6/5241 |
| 2021/0275120 A1* | 9/2021 | Bettoyashiki | G06V 10/764 |
| 2021/0378622 A1 | 12/2021 | Kitano | |
| 2024/0366162 A1* | 11/2024 | Young | A61B 6/505 |

\* cited by examiner

RADIOGRAPHY SYSTEM

CROSS-REFERENCE TO RELATED APPLICATIONS

The present application claims priority under 35 U.S.C. § 119 to Japanese Patent Application No. 2022-145494, filed on Sep. 13, 2022. The above application is hereby expressly incorporated by reference, in its entirety, into the present application.

BACKGROUND OF THE INVENTION

1. Technical Field

The disclosed technology relates to a radiography system.

2. Description of the Related Art

The following technologies are known as technologies related to a system including a radiation generation device and a radiation detection device. For example, JP2021-191389A describes a processing device used in radiation fluoroscopy apparatus comprising a radiation source that irradiates a subject with radiation continuously, and a radiation detector that detects the radiation transmitted through the subject and outputs a radiation image. A processor of the processing device acquires a body thickness of the subject measured by a body thickness measurement sensor, sets a gradation transformation function used for gradation transformation processing for the radiation image according to the body thickness, acquires the radiation image output from the radiation detector, and starts the gradation transformation processing with the set gradation transformation function.

JP2021-137414A describes a radiation intensity estimation device that is used in a movable type radiation generation device that includes a radiation generation unit including a radiation tube which emits radiation and is movable by a carriage unit having wheels, and that estimates an intensity of the radiation before radiography. A processor of the radiation intensity estimation device executes optical image acquisition processing of acquiring, from a camera, an optical image showing an imaging target of the radiography and a periphery of the imaging target, distance information acquisition processing of acquiring, from a distance sensor, distance information indicating a distance from the radiation tube to an object, specifying processing of specifying a type of the object in the optical image, and estimation processing of estimating the intensity of the radiation in an environment shown in the optical image based on reference information including the distance information and a result of specifying the type of the object.

SUMMARY

Stitching imaging is known as a method of capturing the radiation image. The stitching imaging is a method of imaging a range that cannot be covered by a radiation detection device having a standard size. In the stitching imaging, for example, a plurality of radiation images are captured by emitting radiation over a plurality of times while changing an emission direction while moving the radiation detection device in a longitudinal direction.

In the stitching imaging, the radiation source is positioned in a state in which a patient, which is a subject, is positioned such that a desired range of the subject is included in the series of radiation images. For example, in a case in which a distance between the radiation source and the subject is too close, in some cases, the desired range cannot be imaged even in the stitching imaging. The positioning of the radiation source in the stitching imaging requires a lot of time as compared with general imaging. Depending on a state of the patient's illness or injury, in some cases, it is difficult for the patient to maintain a specific posture (for example, standing position) according to an imaging technique for a long period of time.

The disclosed technology has been made in view of the points described above, and is to support work performed in a case of capturing a radiation image.

An aspect of the disclosed technology relates to a radiography system comprising a radiation generation device including a radiation source unit that emits radiation, a projector that projects an image in an emission direction of the radiation, and at least one processor. The processor acquires distance information indicating a distance from the radiation source unit to a projection surface on which the image is projected, acquires a subject image which is a radiation image captured in the past for a subject of the radiation image, derives, based on the distance information, a visualization range of the subject visualized in the radiation image, which is captured for the subject and is based on the radiation emitted from the radiation source unit, trims the subject image based on the visualization range, and causes the projector to project the trimmed subject image.

The radiography system may further comprise a measurement unit that measures the distance from the radiation source unit to the projection surface. The processor may acquire posture information indicating an imaging posture of the subject in a case of capturing the radiation image for the subject, and may select the subject image based on the posture information. The processor may acquire subject information including physique information indicating a physique of the subject, and may set a projection size of the subject image based on the physique information.

The processor may acquire fixed distance information indicating a distance which is fixed as the distance to the projection surface, may acquire range designation information for designating a range of the subject to be visualized in the radiation image captured for the subject, and may derive an emission condition of the radiation based on the fixed distance information and the range designation information. The emission condition may include the number of times of emission of the radiation emitted from the radiation source unit. The processor may control an emission timing for each emission of the radiation emitted from the radiation source unit based on the fixed distance information and the range designation information.

According to the disclosed technology, the work performed in a case of capturing the radiation image can be supported.

BRIEF DESCRIPTION OF THE DRAWINGS

Exemplary embodiments according to the technique of the present disclosure will be described in detail based on the following figures, wherein.

DETAILED DESCRIPTION

Figure 1:
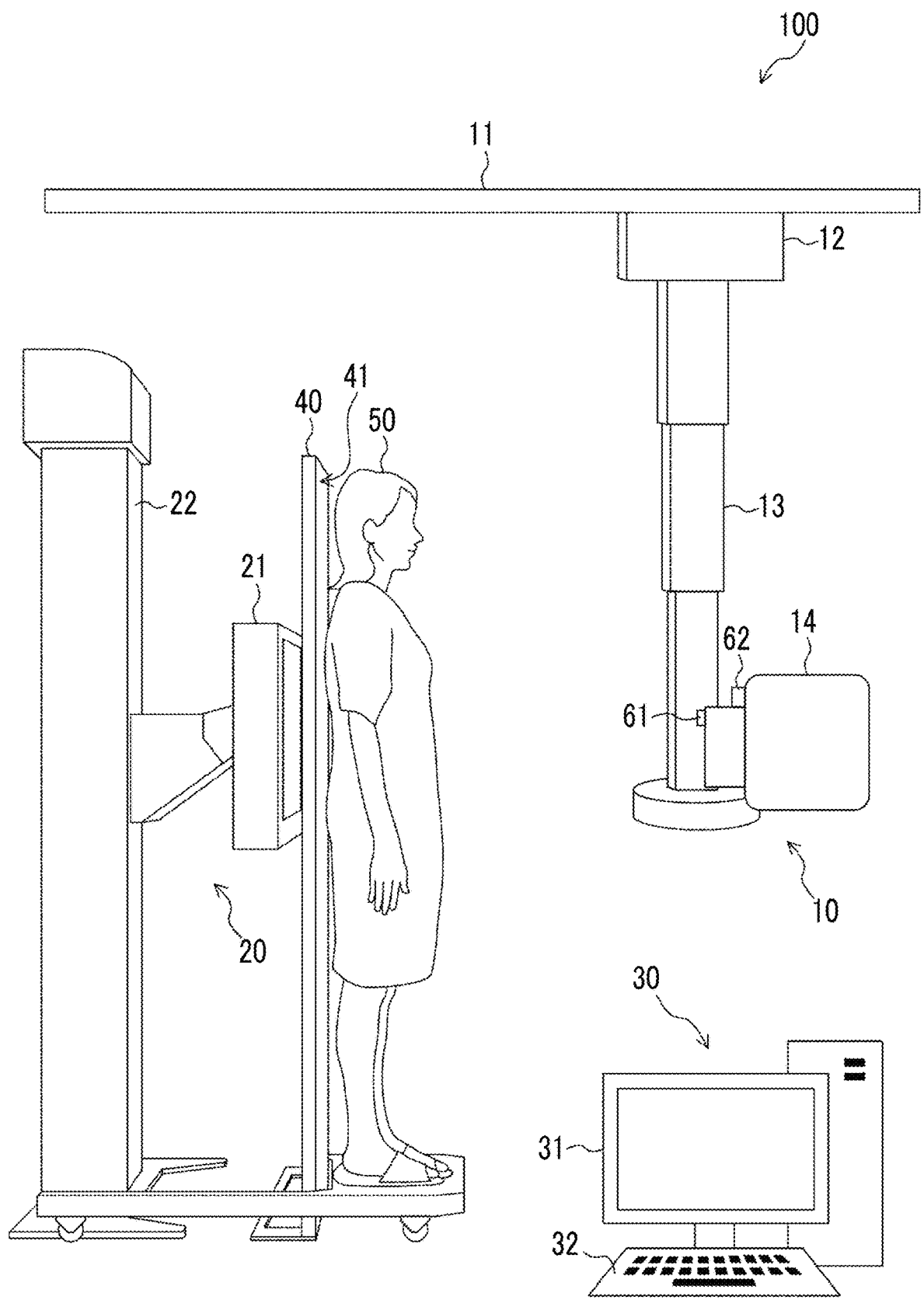
FIG. 1 is a diagram showing an example of a configuration of a radiography system according to an embodiment of the disclosed technology.

Hereinafter, an example of embodiments of the disclosed technology will be described with reference to the drawings. It should be noted that the same or equivalent components and portions in the drawings are assigned by the same reference numerals, and the overlapping description will be omitted.

First Embodiment

FIG. 1 is a diagram showing an example of a configuration of a radiography system 100 according to the embodiment of the disclosed technology. The radiography system 100 includes a radiation generation device 10, a radiation detection device 20, a console 30, and a partition 40.

The radiation generation device 10 emits radiation for capturing a radiation image. The radiation is, for example, X-rays. The radiation generation device 10 has a so-called ceiling traveling type form, and comprises a guide rail 11 attached to the ceiling, a traveling portion 12 traveling on the guide rail 11, a column portion 13, which is expandable and contractible and is connected to the traveling portion 12, and a radiation source unit 14 attached to a distal end of the column portion 13. A detailed configuration of the radiation generation device 10 will be described below.

The radiation detection device 20 detects the radiation emitted from the radiation generation device 10 and generates the radiation image. The radiation detection device 20 includes a detection panel 21 called a flat panel detector (FPD) in which a plurality of pixels that accumulate charges according to the radiation are arranged in a two-dimensional matrix. The radiation detection device 20 starts an accumulation operation of accumulating the charge in the pixel in a case in which the start of the irradiation with the radiation is detected, and starts a readout operation of reading out the charge accumulated in the pixel as an electric signal in a case in which the end of the irradiation with the radiation is detected. The radiation detection device 20 generates the radiation image based on the charge read out from the pixel.

The radiation detection device 20 includes a column portion 22 that supports the detection panel 21 to be able to move up and down.

The console 30 is a desktop-type computer, for example. The console 30 may be a laptop-type or tablet-type computer. The console 30 includes a display 31 for displaying various screens, an input device 32, such as a keyboard and a mouse, and a storage medium (not shown), such as a hard disk. The console 30 is connected to each of the radiation generation device 10 and the radiation detection device 20 in a communicable manner. A form of the communication between these devices may be wired or wireless.

A plurality of types of imaging menus are displayed on the display 31 of the console 30 in a selectable form. A user operates the input device 32 of the console 30 to select one imaging menu that matches an imaging technique designated in an imaging order from among the plurality of types of imaging menus. Imaging menu information indicating the selected imaging menu is transmitted to the radiation generation device 10. The imaging menu information includes information indicating an imaging part, an imaging posture, and an imaging direction of a subject 50. The imaging part is, for example, a chest, a head, a neck, an abdomen, a waist, a shoulder, an elbow, a hand, a knee, or an ankle. The imaging posture is, for example, a standing position, a lying down position decubitus, or a sitting position. The imaging direction is, for example, a front side, a back side, or a lateral side. Subject information is stored in the storage medium (not shown) of the console 30. The subject information includes physique information indicating a physique of the subject 50. The physique information includes at least one of a height, a chest circumference, an abdominal circumference, or a dimension of another part of the subject 50. The subject information may be acquired from, for example, an external system, such as radiology information systems (RIS), or may be acquired by manual input by the user. In addition, the storage medium of the console 30 stores the radiation image captured in the past for the subject 50.

The partition 40 is a plate-like member that is disposed between the radiation detection device 20 and the subject 50 in order to secure the safety of the subject 50 in a case of capturing the radiation image. The partition 40 is made of a material (for example, plastic) that has transmittance to the radiation emitted from the radiation generation device 10. A surface of the partition 40 on the subject 50 side constitutes a projection surface 41 on which a subject image, which will be described below, is projected.

In the radiography system 100, the radiation generation device 10 and the radiation detection device 20 can cooperate with each other to perform stitching imaging. In the stitching imaging, for example, a plurality of radiation images are captured by emitting radiation over a plurality of times from the radiation generation device 10 while changing an emission direction while moving the radiation detection device 20 in a longitudinal direction (direction along the column portion 22).

Figure 2:
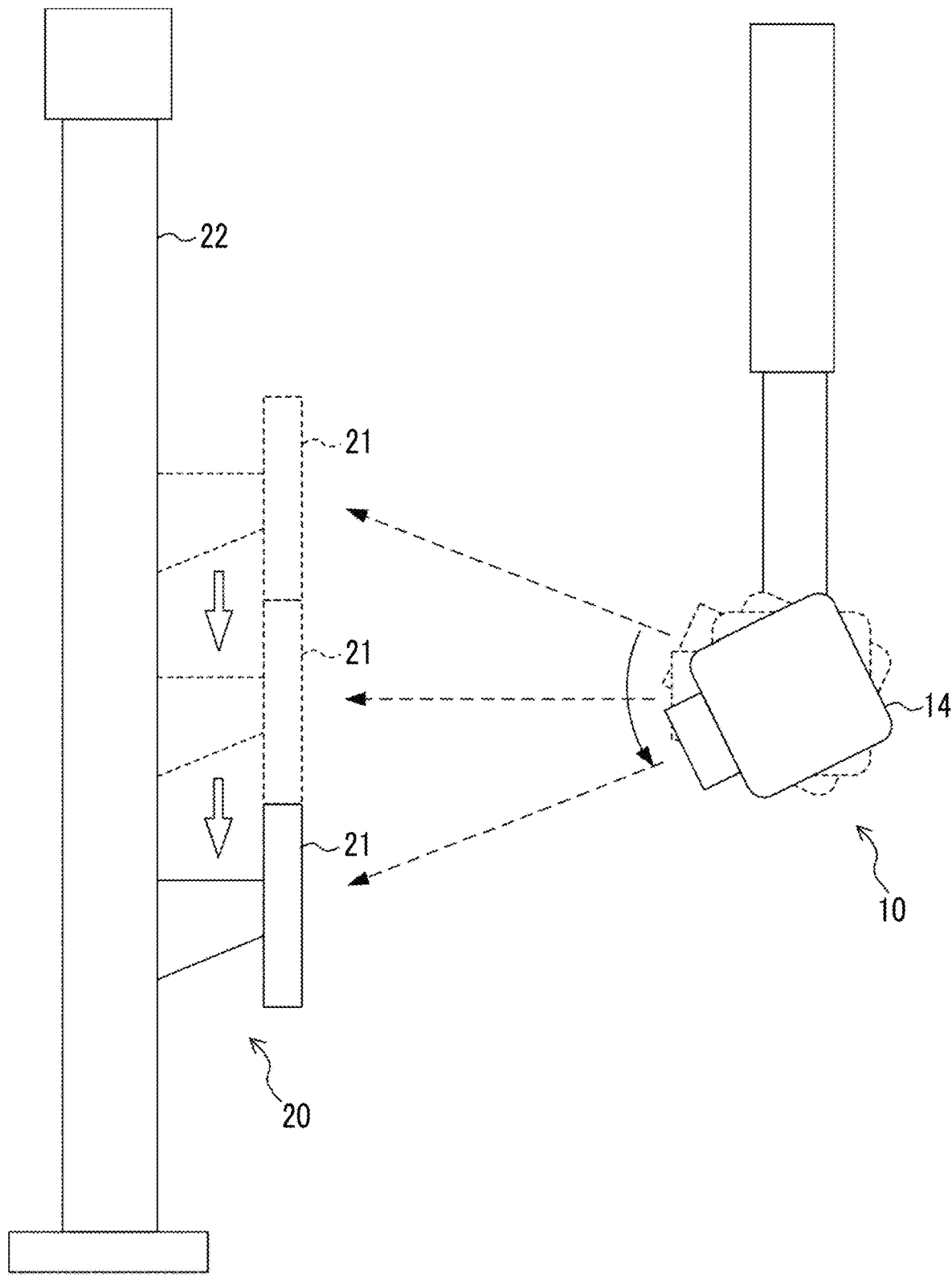
FIG. 2 is a diagram showing an example of operations of a radiation generation device and a radiation detection device during stitching imaging according to the embodiment of the disclosed technology.

FIG. 2 is a diagram showing an example of operations of the radiation generation device 10 and the radiation detection device 20 during the stitching imaging. During the stitching imaging, the detection panel 21 is moved, for example, from an upper side to a lower side in a vertical direction along the column portion 22. The radiation source unit 14 of the radiation generation device 10 rotates in association with the movement of the detection panel 21 such that the emission direction of the radiation indicated by a broken line arrow in FIG. 2 faces the detection panel 21. While the radiation source unit 14 is rotating, the radiation is emitted over a plurality of times at a predetermined timing, and the plurality of radiation images are generated. The plurality of radiation images are combined to create one long-length image. A movement range of the detection panel 21, a rotation angle range of the radiation source unit 14, the number of times of emission of the radiation, and an emission timing of the radiation are set to cover a desired range of the subject in the plurality of radiation images obtained by the stitching imaging.

Figure 3:
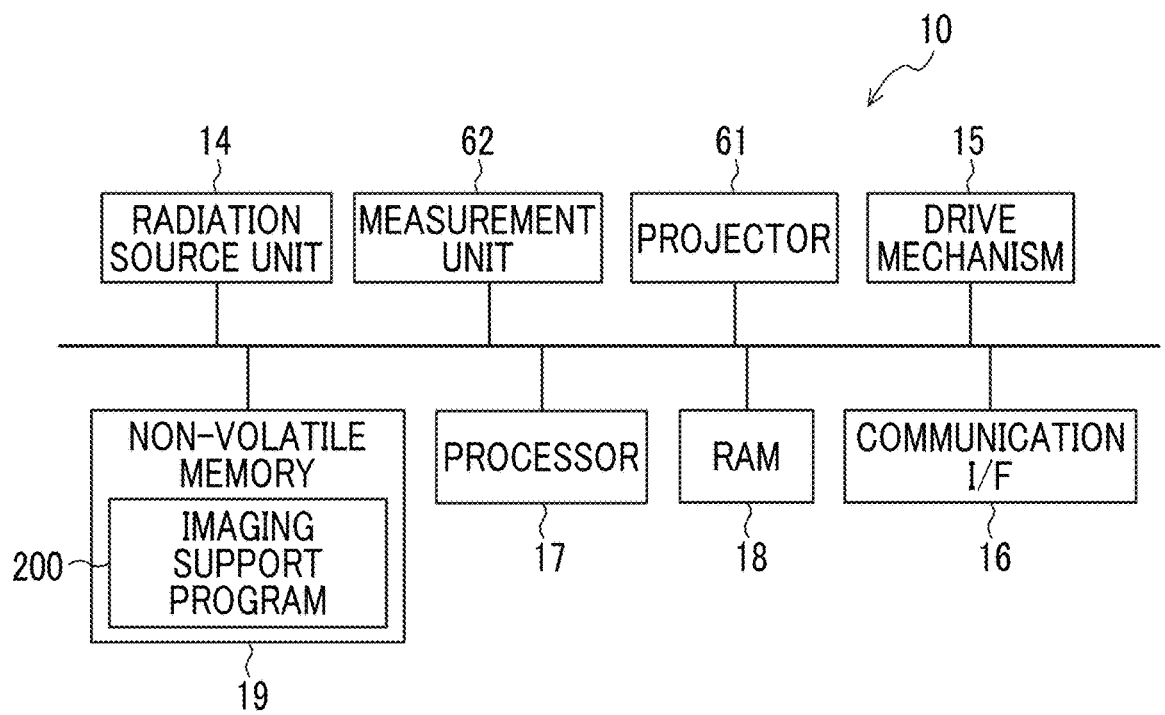
FIG. 3 is a diagram showing an example of a hardware configuration of a control system of the radiation generation device according to the embodiment of the disclosed technology.

FIG. 3 is a diagram showing an example of a hardware configuration of a control system of the radiation generation device 10. The radiation generation device 10 includes the radiation source unit 14, a projector 61, a measurement unit 62, a drive mechanism 15, a communication interface 16, a processor 17, a random access memory (RAM) 18, and a non-volatile memory 19.

The radiation source unit 14 includes a radiation tube and an irradiation field limiting device (none of which are shown). A filament, a target, a grid electrode, and the like (none of which are shown) are provided in the radiation tube. A voltage is applied between the filament which is a cathode, and the target which is an anode. The voltage, which is applied between the filament and the target, is called a tube voltage. The filament releases thermoelectrons according to the applied tube voltage toward the target. The target emits the radiation by the collision of the thermoelectrons from the filament. The grid electrode is disposed between the filament and the target. The grid electrode changes a flow rate of the thermoelectrons from the filament toward the target according to the applied voltage. The flow rate of the thermoelectrons from the filament toward the target is called a tube current.

The irradiation field limiting device is also called a collimator, and limits an irradiation field of the radiation emitted from the radiation tube. The irradiation field limiting device has a configuration in which four shielding plates, such as lead, which shield the radiation are disposed on respective sides of a quadrangle and an emission opening of the quadrangle which transmits the radiation is formed in a central portion, for example. The irradiation field limiting device changes the irradiation field of the radiation by changing a size of the emission opening by changing a position of each shielding plate.

The projector 61 is an image projection device that projects the subject image on the projection surface 41 of the partition 40 before capturing the radiation image. The subject image is the radiation image captured in the past for the subject 50, which is an imaging target of the radiation image, by a stitching imaging method. The projector 61 is provided on a radiation emission side of the radiation source unit 14. That is, an image projection direction of the projector 61 is the same as the emission direction of the radiation.

The measurement unit 62 measures a distance from the radiation source unit 14 to the surface of the partition 40, that is, the projection surface 41, before capturing the radiation image. The distance from the radiation source unit 14 to the projection surface 41 is changed as the traveling portion 12 is moved along the guide rail 11. The measurement unit 62 may be configured by using a distance measurement device that measures a distance to an object surface by using, for example, a time of flight (TOF) method or a light detection and ranging (LiDAR) method. The measurement unit 62 generates distance information indicating the measured distance. The measurement unit 62 is provided on the radiation emission side of the radiation source unit 14.

The drive mechanism 15 includes an electrically driven device, such as a motor for performing a traveling operation of the traveling portion 12, an expansion/contraction operation of the column portion 13, and a rotation operation of the radiation source unit 14. The communication interface 16 is an interface for performing the communication with the console 30. The radiation generation device 10 acquires the subject information including the physique information, the imaging menu information, and the subject image from the console 30 via the communication interface 16.

The non-volatile memory 19 is a non-volatile storage medium, such as a flash memory. An imaging support program 200 is stored in the non-volatile memory 19. The RAM 18 is a work memory for the processor 17 to execute processing. The processor 17 loads the imaging support program 200 stored in the non-volatile memory 19 into the RAM 18 to execute the processing according to the imaging support program 200.

Figure 4:
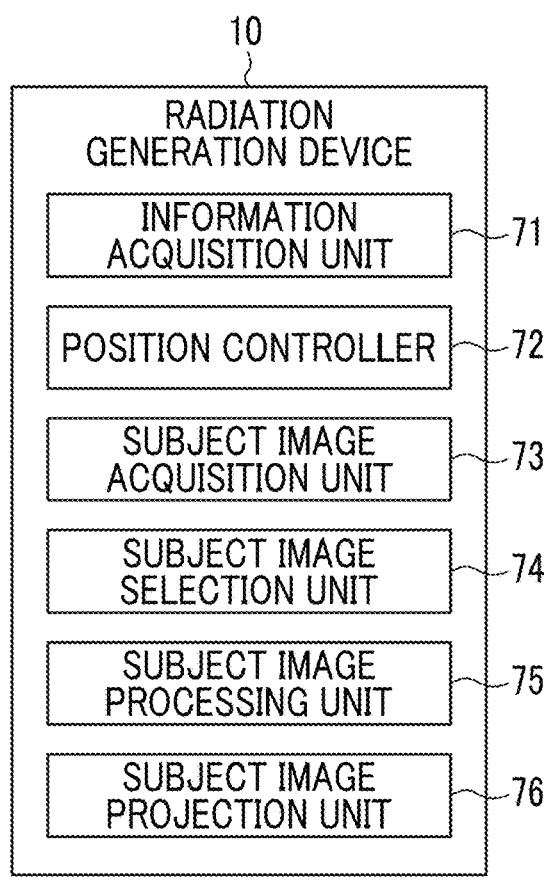
FIG. 4 is a functional block diagram showing an example of a functional configuration of the radiation generation device according to the embodiment of the disclosed technology.

FIG. 4 is a functional block diagram showing an example of a functional configuration of the radiation generation device 10 in a case in which the processor 17 performs imaging support processing (see FIG. 7) according to the imaging support program 200. The processor 17 executes the imaging support program 200 to function as an information acquisition unit 71, a position controller 72, a subject image acquisition unit 73, a subject image selection unit 74, a subject image processing unit 75, and a subject image projection unit 76.

The information acquisition unit 71 acquires the imaging menu information and the subject information transmitted from the console 30. As described above, the imaging menu information includes the information indicating the imaging part, the imaging posture, and the imaging direction of the subject 50. The subject information includes the physique information indicating the physique of the subject 50.

The position controller 72 performs provisional positioning of the radiation source unit 14 based on the information indicating the imaging part, the imaging posture, and the imaging direction included in the imaging menu information acquired by the information acquisition unit 71. That is, the position controller 72 controls the traveling portion 12 and the column portion 13 of the radiation generation device 10 to move the radiation source unit 14 to a position determined according to the imaging part, the imaging posture, and the imaging direction. As a result, a position of the radiation source unit 14 in a horizontal direction and a position of the radiation source unit 14 in a height direction are provisionally determined. The provisional positioning of the radiation source unit 14 may be performed by using, for example, a table in which a relationship between the imaging part, the imaging posture, the imaging direction, and the position of the radiation source unit 14 is determined in advance. It should be noted that the provisional positioning of the radiation source unit 14 can also be performed manually.

The information acquisition unit 71 causes the measurement unit 62 to measure a distance from the provisionally positioned radiation source unit 14 to the projection surface 41 of the partition 40. The measurement unit 62 generates the distance information indicating the distance from the radiation source unit 14 to the projection surface 41. The information acquisition unit 71 acquires the distance information generated by the measurement unit 62.

The subject image acquisition unit 73 acquires the subject image transmitted from the console 30. The subject image is the radiation image captured in the past for the subject 50, which is the imaging target of the radiation image, by the stitching imaging method. It should be noted that the console 30 may download the subject image from a medical information server (not shown). The downloaded subject image is stored in the storage medium (not shown) of the console 30.

The subject image selection unit 74 selects an image to be projected on the projection surface 41 from among the subject images acquired from the subject image acquisition unit 73, based on the information indicating the imaging part, the imaging posture, and the imaging direction included in the imaging menu information acquired by the information acquisition unit 71. For example, in a case in which the imaging part, the imaging posture, and the imaging direction indicated by the imaging menu information are "chest", "standing position", and "front side", respectively, the subject image selection unit 74 selects an image in which the imaging part, the imaging posture, and the imaging direction are "chest", "standing position", and "front side", respectively, from among the subject images acquired by the subject image acquisition unit 73. It should be noted that meta information indicating the imaging part, the imaging posture, and the imaging direction may be assigned to each of the subject images. In this case, the subject image selection unit 74 may specify the imaging part, the imaging posture, and the imaging direction in the subject image with reference to the meta information.

Figure 5:
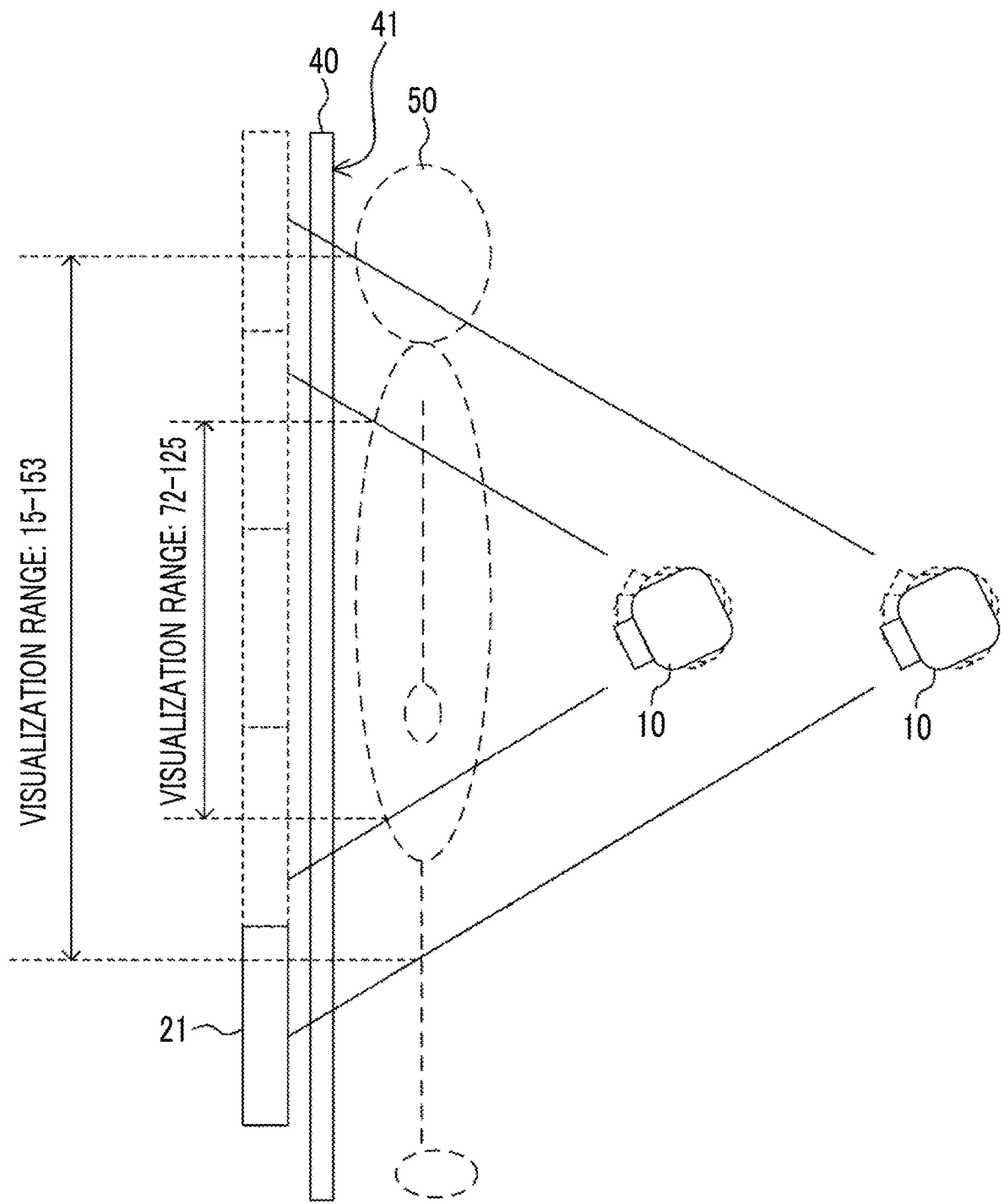
FIG. 5 is a diagram showing a relationship between a distance from a radiation source unit and a projection surface and a visualization range of a subject visualized in a radiation image according to the embodiment of the disclosed technology.

The subject image processing unit 75 derives a visualization range of the subject 50, which is visualized in the radiation image based on the radiation emitted from the radiation source unit 14, based on the distance information acquired by the information acquisition unit 71. FIG. 5 is a diagram showing a relationship between the distance from the radiation source unit 14 to the projection surface 41 and the visualization range of the subject 50 visualized in the radiation image based on the radiation emitted from the radiation source unit 14. As shown in FIG. 5, in a case in which the radiation image is captured for the subject 50, the partition 40 is installed in front of the detection panel 21, and the subject 50 is positioned in front of the partition 40. As the distance from the radiation source unit 14 to the projection surface 41 is shorter, the irradiation range of the radiation transmitted through the subject 50 is narrower. As a result, the visualization range of the subject 50 visualized in the radiation image is narrowed. A distance from the radiation source unit 14 to the subject 50 and a distance from the radiation source unit 14 to the detection panel 21 can be estimated from the distance from the radiation source unit 14 to the projection surface 41 indicated by the distance information. Therefore, it is possible to derive the visualization range of the subject 50 based on the distance information.

The subject image processing unit 75 derives the visualization range of the subject 50 visualized in the radiation image based on a size of the irradiation field (aperture of the irradiation field limiting device) of the radiation, the height position of the radiation source unit 14, and the physique information of the subject 50, in addition to the distance information. Although method of defining the visualization range is not particularly limited, for example, the visualization range may be defined by a serial number assigned to each part of the subject 50 along the longitudinal direction in the stitching imaging at predetermined intervals. The serial number may be assigned such that, for example, the crown of the subject 50 is set to "0" and is incremented by 1 in the longitudinal direction at intervals of 1 cm. The serial number is like a scale of a ruler. FIG. 5 shows an example in which "72-125" is derived as the visualization range in a case in which the distance from the radiation source unit 14 to the projection surface 41 is relatively short, and "15-153" is derived as the visualization range in a case in which the distance from the radiation source unit 14 to the projection surface 41 is relatively long.

The subject image processing unit 75 trims the subject image acquired by the subject image acquisition unit 73 based on the derived visualization range. As described above, as the distance from the radiation source unit 14 to the projection surface 41 is shorter, the visualization range of the subject 50 visualized in the radiation image is narrower. It is assumed that the subject 50 is visualized over a range wider than the visualization range derived based on the distance information in the subject image. The subject image processing unit 75 performs processing of cutting out a range corresponding to the visualization range derived based on the distance information from the subject image as trimming. For example, a number corresponding to the serial number for specifying the visualization range derived based on the distance information may be assigned to each part of the subject image along the longitudinal direction, and a range that matches a range of the serial number indicating the visualization range derived based on the distance information may be cut out from the subject image. It should be noted that the subject image processing unit 75 may perform processing of edging a partial image in the original image as trimming, instead of the processing of cutting out the partial image included in the original image from the original image.

The subject image processing unit 75 sets a projection size of the subject image based on the physique information and the distance information acquired by the information acquisition unit 71. That is, in a case in which the subject image processing unit 75 sets the projection size of the subject image such that the subject image projected on the projection surface 41 has an actual size in a case in which the projector 61 projects the subject image on the projection surface 41 from a position separated from the projection surface 41 by the distance indicated by the distance information. The subject image processing unit 75 enlarges or reduces a size of the subject image such that the size of the subject image projected on the projection surface 41 matches the height, the chest circumference, the abdominal circumference, or the dimension of another part of the subject 50 indicated by the physique information. It should be noted that, in a case in which the projector 61 has a zoom function, the projection size of the subject image may be set by the zoom function of the projector 61.

Figure 6:
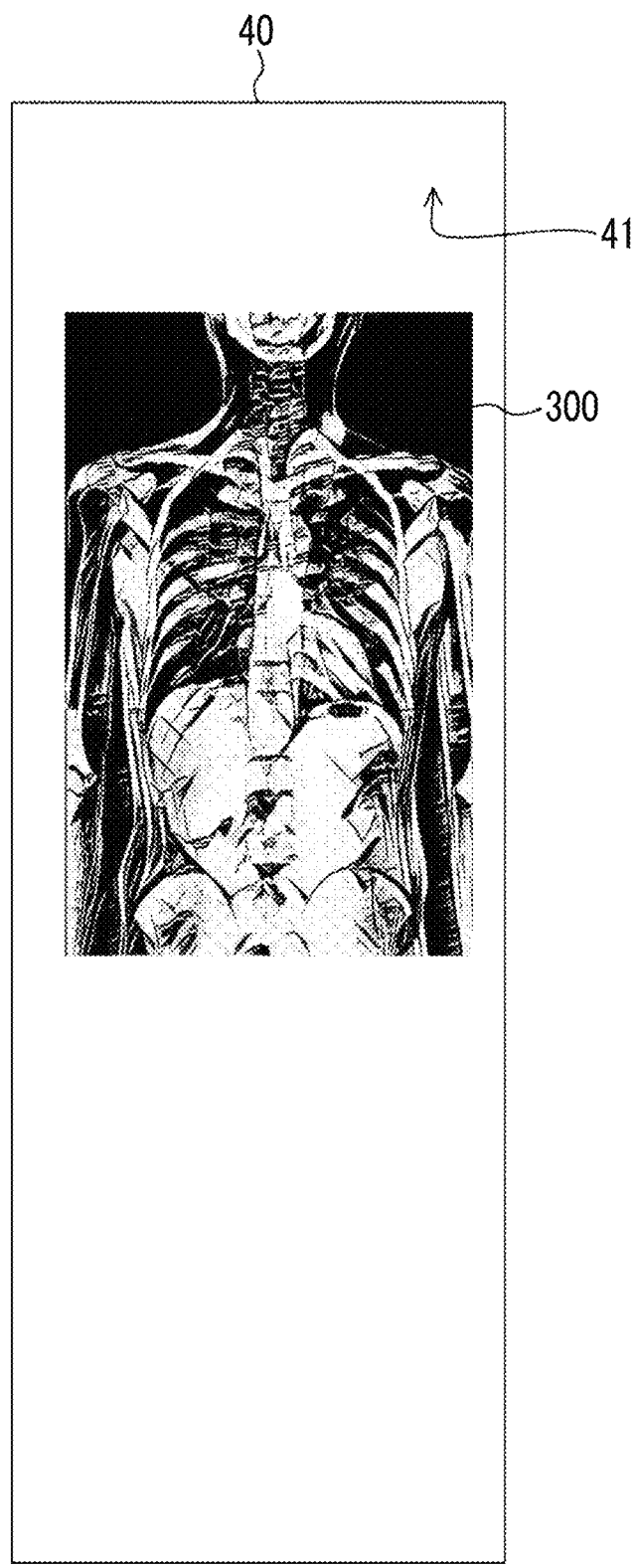
FIG. 6 is a diagram showing an example of a subject image projected on the projection surface according to the embodiment of the disclosed technology.

The subject image projection unit 76 performs processing of projecting the subject image trimmed by the subject image processing unit 75 on the projector 61 with the set projection size. As a result, the trimmed subject image is projected on the projection surface 41 in the actual size. FIG. 6 is a diagram showing an example of a subject image 300 projected on the projection surface 41.

Figure 7:
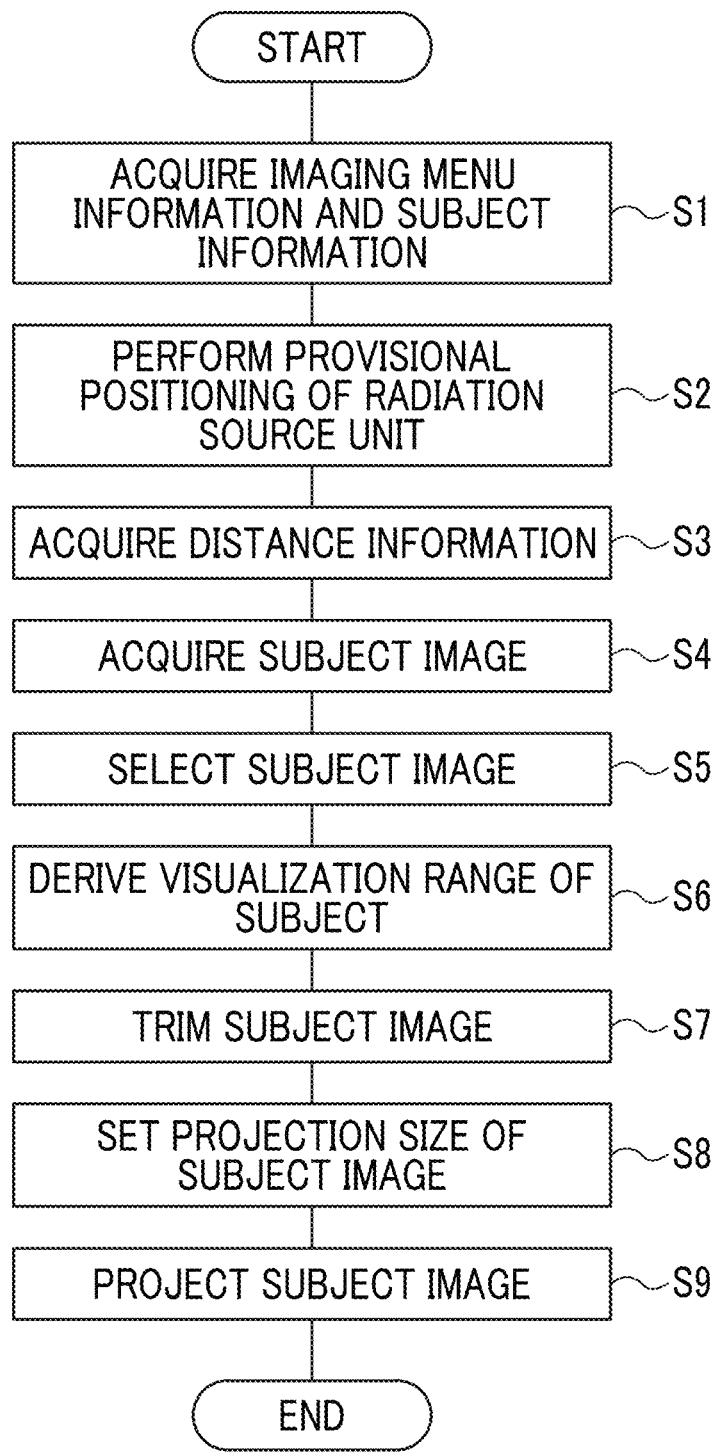
FIG. 7 is a flowchart showing an example of a flow of imaging support processing according to the embodiment of the disclosed technology.

FIG. 7 is a flowchart showing an example of a flow of the imaging support processing implemented by the processor 17 executing the imaging support program 200. The imaging support program 200 is executed, for example, in a case in which the user makes an instruction to start the processing from the console 30. Typically, the imaging support processing is performed before the subject 50 is positioned, that is, before the subject 50 is disposed in front of the partition 40.

In step S1, the information acquisition unit 71 acquires the imaging menu information and the subject information transmitted from the console 30. The imaging menu information includes the information indicating the imaging part, the imaging posture, and the imaging direction of the subject 50, and the physique information of the subject 50. The subject information includes physique information indicating a physique of the subject 50.

In step S2, the position controller 72 performs the provisional positioning of the radiation source unit 14 based on the imaging menu information acquired in step S1. That is, the position controller 72 controls the traveling portion 12 and the column portion 13 of the radiation generation device 10 to move the radiation source unit 14 to a position determined according to the imaging part, the imaging posture, and the imaging direction. As a result, the position of the radiation source unit 14 in the height direction and the position of the radiation source unit 14 in the horizontal direction are provisionally determined.

In step S3, the information acquisition unit 71 acquires the distance information indicating the distance from the radiation source unit 14 to the projection surface 41 by causing the measurement unit 62 to measure the distance from the radiation source unit 14 to the partition 40.

In step S4, the subject image acquisition unit 73 acquires the subject image transmitted from the console 30. The subject image is the radiation image captured in the past for the subject 50, which is the imaging target of the radiation image, by the stitching imaging method.

In step S5, the subject image selection unit 74 selects the image to be projected on the projection surface 41 from among the subject images acquired in step S4, based on the information indicating the imaging part, the imaging posture, and the imaging direction included in the imaging menu information acquired in step S1.

In step S6, the subject image processing unit 75 derives the visualization range of the subject 50, which is visualized in the radiation image based on the radiation emitted from the radiation source unit 14, based on the distance information acquired in step S3.

In step S7, the subject image processing unit 75 trims the subject image acquired in step S4 based on the visualization range derived in step S6. For example, the subject image processing unit 75 performs the processing of cutting out the range corresponding to the visualization range derived in step S6 from the subject image acquired in step S4 as trimming.

In step S8, the subject image processing unit 75 sets the projection size of the subject image trimmed in step S7 based on the physique information included in the subject information acquired in step S1 and the distance information acquired in step S3. That is, in a case in which the subject image processing unit 75 sets the projection size of the subject image such that the subject image projected on the projection surface 41 has the actual size in a case in which the projector 61 projects the subject image on the projection surface 41 from the position separated from the projection surface 41 by the distance indicated by the distance information.

In step S9, the subject image projection unit 76 performs the processing of projecting the subject image trimmed in step S7 on the projector 61 with the projection size set in step S8. As a result, the trimmed subject image is projected on the projection surface 41 in the actual size.

As described above, the radiography system 100 according to the embodiment of the disclosed technology includes the radiation generation device 10 including the radiation source unit 14 that emits the radiation, the projector 61 that projects the image in the emission direction of the radiation, and the processor 17. The processor 17 acquires the distance information indicating the distance from the radiation source unit 14 to the projection surface 41 and the subject image which is the radiation image captured in the past for the subject 50. The processor 17 derives the visualization range of the subject 50 visualized in the radiation image, which is captured for the subject 50 and is based on the radiation emitted from the radiation source unit 14, based on the distance information. The processor 17 trims the subject image based on the visualization range, and projects the trimmed subject image on the projector 61.

In the stitching imaging, the radiation source is positioned in a state in which a patient, which is the subject, is positioned such that the desired range is included in the series of radiation images. For example, in a case in which a distance between the radiation source and the subject is too close, in some cases, the desired range cannot be imaged even in the stitching imaging. The positioning of the radiation source in the stitching imaging requires a lot of time as compared with general imaging. Depending on a state of the patient's illness or injury, in some cases, it is difficult for the patient to maintain a specific posture (for example, standing position) according to an imaging technique for a long period of time.

With the radiography system 100 according to the embodiment of the disclosed technology, it is possible to support the work performed in a case of capturing the radiation image. Specifically, it is possible to grasp the visualization range of the subject 50 visualized in the radiation image before the positioning of the subject 50 is performed. Therefore, it is possible to take measures, such as determining appropriateness of the position of the radiation source unit 14 and correcting the position of the radiation source unit 14, as necessary before the positioning of the subject 50 is performed. It is possible to reduce the burden on the subject 50 by completing a part of the work performed in a case of capturing the radiation image before the positioning of the subject 50 is performed.

It should be noted that, in the present embodiment, as an example, the case is described in which all pieces of processing shown in FIG. 7 are performed by the processor 17 of the radiation generation device 10, but a processor (not shown) of the console 30 may perform at least a part of these pieces of processing. For example, the processor of the console 30 may execute at least one of the processing of selecting the subject image (step S5), the processing of deriving the visualization range of the subject (step S6), the processing of trimming the subject image (step S7), or the processing of setting the projection size of the subject image (step S8) among the pieces of processing shown in FIG. 7.

Second Embodiment

Figure 8:
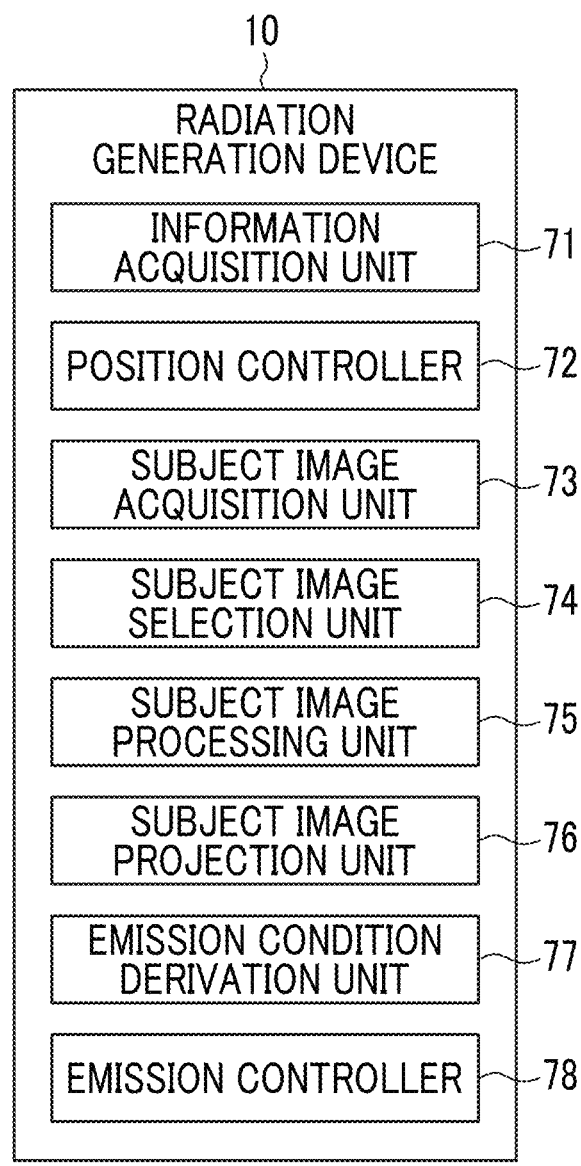
FIG. 8 is a functional block diagram showing an example of the functional configuration of the radiation generation device according to the embodiment of the disclosed technology.

FIG. 8 is a functional block diagram showing an example of a functional configuration of the radiation generation device 10 in a case in which the processor 17 of the radiation generation device 10 according to the second embodiment of the disclosed technology performs the imaging support processing (see FIG. 9) according to the imaging support program 200. The processor 17 is different from that of the first embodiment described above in that the processor 17 further functions as an emission condition derivation unit 77 and an emission controller 78.

The information acquisition unit 71 according to the second embodiment acquires fixed distance information indicating a fixed distance as the distance from the radiation source unit 14 to the projection surface 41. The fixed distance information is information indicating the distance from the radiation source unit 14 to the projection surface 41 in a case in which the radiation source unit 14 is disposed at a position fixed as the position of the radiation source unit 14 in a case of capturing the radiation image. The fixed distance information can be acquired by causing the measurement unit 62 to perform the distance measurement in a state in which the radiation source unit 14 is positioned at the fixed position.

In addition, the information acquisition unit 71 according to the second embodiment acquires range designation information for designating a range of the subject 50 to be visualized in the radiation image captured for the subject 50. Although method of defining the range of the subject 50 to be visualized in the radiation image is not particularly limited, for example, the range of the subject 50 to be visualized in the radiation image may be defined by a serial number assigned to each part of the subject 50 along the longitudinal direction in the stitching imaging at predetermined intervals.

The emission condition derivation unit 77 derives an emission condition of the radiation based on the fixed distance information and the range designation information. That is, the emission condition derivation unit 77 derives the number of times of emission of the radiation and the rotation angle range of the radiation source unit 14 such that the range of the subject 50 indicated by the range designation information is included in the series of radiation images obtained by the stitching imaging in a case in which the radiation is emitted from the position separated from the projection surface 41 by a distance indicated by the fixed distance information. As the distance from the radiation source unit 14 to the projection surface 41 is shorter and the range of the subject 50 to be visualized in the radiation image is wider, the number of times of emission of the radiation is larger and the rotation angle range of the radiation source unit 14 is wider. The emission condition derivation unit 77 may further derive the tube current and the tube voltage based on the fixed distance information.

In a case in which the instruction to start the emission of the radiation is received, the emission controller 78 controls the emission timing of each emission of the radiation emitted at the number of times derived by the emission condition derivation unit 77. The emission controller 78 performs control of rotating the radiation source unit 14 in the rotation angle range derived by the emission condition derivation unit 77, and emitting the radiation from the radiation source unit 14 at a timing at which the radiation source unit 14 is positioned at a predetermined rotation angle position.

Figure 9:
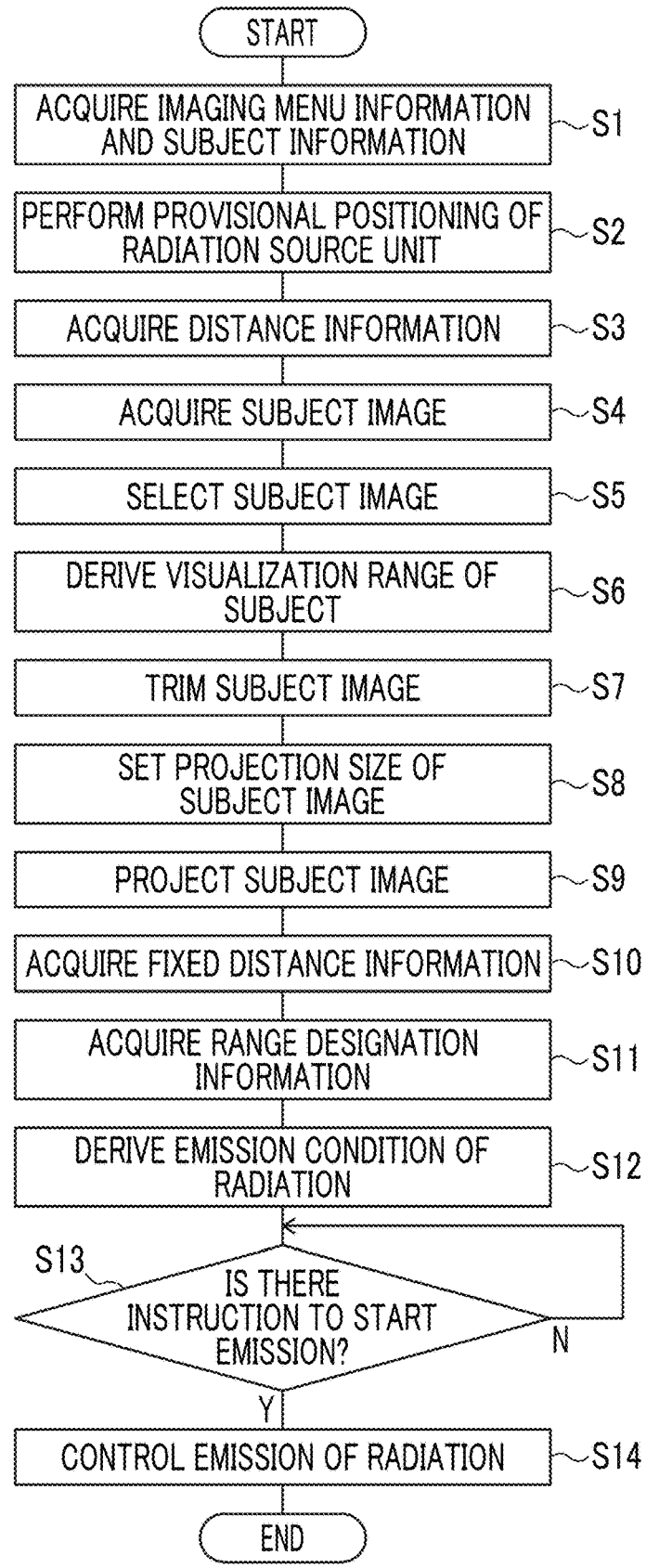
FIG. 9 is a flowchart showing an example of a flow of the imaging support processing according to the embodiment of the disclosed technology.

FIG. 9 is a flowchart showing an example of a flow of the imaging support processing implemented by the processor 17 according to the second embodiment executing the imaging support program 200. It should be noted that, in the flowchart shown in FIG. 9, since the pieces of processing from step S1 to step S9 are the same as those in the first embodiment described above, the description of these pieces of processing will be omitted.

In step S10, the information acquisition unit 71 acquires the fixed distance information indicating the fixed distance as the distance from the radiation source unit 14 to the projection surface 41.

In step S11, the information acquisition unit 71 acquires the range designation information for designating the range of the subject 50 to be visualized in the radiation image captured for the subject 50.

In step S12, the emission condition derivation unit 77 derives the emission condition of the radiation based on the fixed distance information acquired in step S10 and the range designation information acquired in step S11. That is, the emission condition derivation unit 77 derives the number of times of emission of the radiation and the rotation angle range of the radiation source unit 14 such that the range of the subject 50 indicated by the range designation information is included in the series of radiation images obtained by the stitching imaging in a case in which the radiation is emitted from the position separated from the projection surface 41 by the distance indicated by the fixed distance information.

In step S13, the emission controller 78 determines whether or not there is the instruction to start the emission of the radiation. It should be noted that the instruction to start the emission of the radiation can be made, for example, by the user operating the console 30.

In step S14, the emission controller 78 controls the emission timing of each emission of the radiation emitted at the number of times derived by the emission condition derivation unit 77. The emission controller 78 performs the control of rotating the radiation source unit 14 in the rotation angle range derived in step S12, and emitting the radiation from the radiation source unit 14 at the timing at which the radiation source unit 14 is positioned at the predetermined rotation angle position.

With the radiation generation device 10 according to the second embodiment of the disclosed technology, it is possible to perform the stitching imaging under an appropriate imaging condition according to the position of the radiation source unit 14. That is, it is possible to promote the effect of supporting the work performed in a case of capturing the radiation image.

In the embodiments described above, for example, as a hardware structure of the processing unit that executes various pieces of processing, such as the information acquisition unit 71, the position controller 72, the subject image acquisition unit 73, the subject image selection unit 74, the subject image processing unit 75, the subject image projection unit 76, the emission condition derivation unit 77, and the emission controller 78, various processors as described below can be used. The various processors include, in addition to a CPU and a GPU, which are general-purpose processors which execute software (program) and function as various processing units as described above, a programmable logic device (PLD) which is a processor whose circuit configuration can be changed after manufacture, such as an FPGA, and a dedicated electric circuit which is a processor having a circuit configuration which is designed for exclusive use in order to execute specific processing, such as an application specific integrated circuit (ASIC).

One processing unit may be configured by using one of the various processors or may be configured by using a combination of two or more processors of the same type or different types (for example, a combination of a plurality of FPGAs or a combination of a CPU and an FPGA). In addition, a plurality of the processing units may be configured by using one processor.

A first example of the configuration in which the plurality of processing units are configured by using one processor is a form in which one processor is configured by using a combination of one or more CPUs and the software and this processor functions as the plurality of processing units, as represented by computers, such as a client and a server. A second example thereof is a form of using a processor that realizes the function of the entire system including the plurality of processing units by one integrated circuit (IC) chip, as represented by a system on chip (SoC) or the like.

In this way, as the hardware structure, the various processing units are configured by using one or more of the various processors described above.

Further, more specifically, as the hardware structure of the various processors, an electric circuit (circuitry) in which circuit elements, such as semiconductor elements, are combined can be used.

Moreover, in the embodiments described above, the aspect is described in which the imaging support program 200 is stored (installed) in advance in the non-volatile memory 103, but the disclosed technology is not limited to this. The imaging support program 200 may be provided in a form of being recorded in a recording medium, such as a compact disc read only memory (CD-ROM), a digital versatile disc read only memory (DVD-ROM), and a universal serial bus (USB) memory. Moreover, the imaging support program 200 may be provided in a form being downloaded from an external device via a network. That is, the program (that is, a program product) described in the present embodiment may be provided by the recording medium or in a form of being distributed from an external computer.

In regard to the first and second embodiments described above, the following additional remarks will be further disclosed.

Additional Remark 1

A radiography system comprising a radiation generation device including a radiation source unit that emits radiation, a projector that projects an image in an emission direction of the radiation, and at least one processor, in which the processor acquires distance information indicating a distance from the radiation source unit to a projection surface on which the image is projected, acquires a subject image which is a radiation image captured in the past for a subject of the radiation image, derives, based on the distance information, a visualization range of the subject visualized in the radiation image, which is captured for the subject and is based on the radiation emitted from the radiation source unit, trims the subject image based on the visualization range, and causes the projector to project the trimmed subject image.

Additional Remark 2

The radiography system according to additional remark 1, further comprising a measurement unit that measures the distance from the radiation source unit to the projection surface.

Additional Remark 3

The radiography system according to additional remark 1 or 2, in which the processor acquires posture information indicating an imaging posture of the subject in a case of capturing the radiation image for the subject, and selects the subject image based on the posture information.

Additional Remark 4

The radiography system according to any one of additional remarks 1 to 3, in which the processor acquires subject information including physique information indicating a physique of the subject, and sets a projection size of the subject image based on the physique information.

Additional Remark 5

The radiography system according to any one of additional remarks 1 to 4, in which the processor acquires fixed distance information indicating a distance which is fixed as the distance to the projection surface, acquires range designation information for designating a range of the subject to be visualized in the radiation image captured for the subject, and derives an emission condition of the radiation based on the fixed distance information and the range designation information.

Additional Remark 6

The radiography system according to additional remark 5, in which the emission condition includes the number of times of emission of the radiation emitted from the radiation source unit.

Additional Remark 7

The radiography system according to additional remark 6, in which the processor controls an emission timing for each emission of the radiation emitted from the radiation source unit based on the fixed distance information and the range designation information.

What is claimed is:

1. A radiography system comprising:
    a radiation generation device including a radiation source unit that emits radiation;
    a projector that projects an image in an emission direction of the radiation; and
    at least one processor,
    wherein the at least one processor
        acquires distance information indicating a distance from the radiation source unit to a projection surface on which the image is projected,
        acquires a subject image which is a radiation image captured in the past for a subject of the radiation image,
        derives, based on the distance information, a visualization range of the subject visualized in the radiation image, which is captured for the subject and is based on the radiation emitted from the radiation source unit,
        trims the subject image based on the visualization range, and
        causes the projector to project the trimmed subject image.

2. The radiography system according to claim 1, further comprising:
    a distance sensor that measures the distance from the radiation source unit to the projection surface.

3. The radiography system according to claim 1,
    wherein the at least one processor
        acquires posture information indicating an imaging posture of the subject in a case of capturing the radiation image for the subject, and
        selects the subject image based on the posture information.

4. The radiography system according to claim 1,
    wherein the at least one processor
        acquires subject information including physique information indicating a physique of the subject, and
        sets a projection size of the subject image based on the physique information.

5. The radiography system according to claim 1,
    wherein the at least one processor
        acquires fixed distance information indicating a distance which is fixed as the distance from the radiation source unit to the projection surface, acquires range designation information for designating a range of the subject to be visualized in the radiation image captured for the subject, and derives an emission condition of the radiation based on the fixed distance information and the range designation information.

6. The radiography system according to claim 5, wherein the emission condition includes a number of times of emission of the radiation emitted from the radiation source unit.

7. The radiography system according to claim 6, wherein the at least one processor controls an emission timing for each emission of the radiation emitted from the radiation source unit based on the fixed distance information and the range designation information.

* * * * *